// 
US006963408B2

(12) United States Patent
Ishii et al.

(10) Patent No.: US 6,963,408 B2
(45) Date of Patent: Nov. 8, 2005

(54) METHOD AND APPARATUS FOR POINT DIFFRACTION INTERFEROMETRY

(75) Inventors: Mikihiko Ishii, Kitaadachi-gun (JP); Hisashi Shiozawa, Yokohama (JP); Jun Kawakami, Mito (JP); Yasushi Fukutomi, Sagamihara (JP); Yutaka Ichihara, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/802,840

(22) Filed: Mar. 18, 2004

(65) Prior Publication Data

US 2004/0252311 A1 Dec. 16, 2004

Related U.S. Application Data

(63) Continuation of application No. PCT/JP02/10003, filed on Sep. 27, 2002.

(30) Foreign Application Priority Data

Sep. 27, 2001 (JP) ............................. 2001-297902

(51) Int. Cl.[7] .............................................. G01B 9/02
(52) U.S. Cl. ..................................................... 356/521
(58) Field of Search ............................. 356/494, 512, 356/515, 521, 513, 514, 511

(56) References Cited

U.S. PATENT DOCUMENTS 4,872,755 A   10/1989  Kuchel
5,076,695 A   12/1991  Ichihara
5,216,527 A    6/1993  Sharnoff et al.
5,835,217 A *  11/1998  Medecki ...................... 356/521
5,933,236 A    8/1999  Sommargren
6,614,535 B1 * 9/2003  Kakuchi et al. ............ 356/515

FOREIGN PATENT DOCUMENTS

| JP | A 57-64139    | 4/1982 |
| JP | A 2-228505    | 9/1990 |
| JP | A 6-174447    | 6/1994 |
| JP | A 2000-097616 | 4/2000 |

* cited by examiner

Primary Examiner—Zandra V. Smith
Assistant Examiner—Michael A. Lyons
(74) Attorney, Agent, or Firm—Oliff & Berridge PLC

(57) ABSTRACT

A point diffraction interference measuring method comprises forming a substantially ideal spherical wave by using a point light source-generating unit 101, 102, allowing a light flux composed of the spherical wave to pass through a test sample 109, thereafter dividing the light flux into two light fluxes by using an optical path-dividing element 105, allowing one light flux of the divided light fluxes to pass through a pinhole 129 to covert the one light flux into a reference light beam which is a substantially ideal spherical wave, and detecting interference fringes generated by causing interference between the reference light beam and a measuring light beam which is the other light flux of the divided light fluxes. The wavefront aberration of the test sample can be measured by observing the interference fringes without being affected by the disturbance which would be otherwise caused by any system vibration or the like.

32 Claims, 8 Drawing Sheets

METHOD AND APPARATUS FOR POINT DIFFRACTION INTERFEROMETRY

This is a Continuation of International Application PCT/JP02/10003 filed Sep. 27, 2002, the entire contents of which are herein incorporated by reference.

TECHNICAL FIELD

The present invention relates to a point diffraction interference measuring method and a point diffraction interference measuring apparatus which utilize the point diffraction interferometry, and a method for producing a projection lens which uses the measuring method.

BACKGROUND ART

Semiconductor-producing apparatuses are used to produce semiconductor devices. For example, a reduction projection type sequential exposure apparatus (hereinafter appropriately referred to as "stepper") is exemplified as a representative semiconductor-producing apparatus. The stepper is equipped with a highly accurate projection lens. In order to guarantee the accuracy of the highly accurate projection lens, it is necessary to measure the transmission wavefront aberration or the reflection wavefront aberration for the entire projection lens and each of optical elements for constructing the projection lens in the actual exposure wavelength area. For this purpose, a variety of interferometers have been suggested, each of which uses a light source having high coherence for emitting a light beam having a wavelength which is the same as that included in the exposure wavelength area or which is substantially equal to that included in the exposure wavelength area.

The high degree of integration of the semiconductor device is advanced in recent years. In order to respond to the advance of the high degree of integration, the exposure wavelength of the stepper is shortened. For example, the wavelength is shortened to the i-ray ($\lambda$=365 nm) from the g-ray ($\lambda$=436 nm) which is based on the use of the high pressure mercury lamp as a light source. Further, the wavelength is shortened to the ArF excimer laser ($\lambda$=193 nm) from the KrF excimer laser ($\lambda$=248 nm). As a result, it is extremely difficult to obtain an available light source which has high coherence and which has an oscillation wavelength in the vicinity of the exposure wavelength. Therefore, a point diffraction interference measuring apparatus has been suggested, which is based on the use of the point diffraction interferometry capable of performing highly accurate interferometry or interference measurement even by using a light source having relatively low coherence.

Such a conventional point diffraction interference measuring apparatus will be explained below with reference to an accompanying drawing. FIG. 8 shows a schematic arrangement of the conventional point diffraction interference measuring apparatus. In FIG. 8, a light flux, which is emitted from a light source 1, illuminates a pinhole 2. The light beam, which has outgone from the pinhole 2, can be regarded as an approximately ideal spherical wave. The spherical wave, which has outgone from the pinhole 2, passes across a collimator lens 3, a bending mirror 4, a beam splitter 5, a bending mirror 6, a bending mirror 7, and a light-collecting lens 8 successively in this order from the side of the light source 1. The light beam, which has outgone from the light-collecting lens 8, is transmitted through a test sample 9, and the light beam is reflected by a bending mirror 10.

The reflected light beam again passes across the test sample 9, the light-collecting lens 8, the bending mirror 7, and the bending mirror 6 successively in this order from the side of the bending mirror 10. The light beam is reflected by the beam splitter 5 toward a light-collecting lens 11. The light beam, which has been reflected by the beam splitter 5, comes into a diffraction grating 12 after passing through the light-collecting lens 11.

The light beam, which has come into the diffraction grating 12, is diffracted by the diffraction grating 12 into a 0-order light beam, a +1-order light beam, and diffracted light beams having other orders. The 0-order light beam comes into a pinhole 13a which is provided in order to generate a reference light beam. The light beam, which has outgone from the pinhole 13a, can be regarded as an approximately ideal spherical wave. Therefore, this light beam serves as the reference light beam. The +1-order light beam comes into a window 13b which is provided in order to allow a measuring light beam to pass therethrough. The reference light beam which has outgone from the pinhole 13a and the measuring light beam which has outgone from the window 13b pass through a collimator lens 14, and they come into an interference fringe-detecting section 15. Interference fringes, which are formed by the interference caused between the reference light beam and the measuring light beam, can be observed with the interference fringe-detecting section 15.

The conventional point diffraction interference measuring apparatus described above uses the diffraction grating in order to separate the light flux. Therefore, a problem arises such that the diffracted light beams having the orders other than those of the 0-order and +1-order light beams come into the pinhole 13a and the window 13b to generate any noise light beam.

Further, the 0-order spot light beam coming into the pinhole 13a and the +1-order spot light beam coming into the window 13b are widened or spread due to the aberration respectively. Therefore, a problem arises such that the spot light beams are hardly separated from each other, and they mutually behave as noise light beams. The presence of the noise light beams as described above has lowered S/N or the dynamic range during the detection of the interference fringes.

The light flux, which comes into the pinhole as described above, is converted into the approximately ideal spherical wave by passing through the pinhole. It is noted that the light amount of the generated spherical wave differs depending on the aberration of the light flux coming into the pinhole. The light amount of the light flux coming into the pinhole is determined by the design of the diffraction grating. When the aberration of the light flux coming into the pinhole is small, and the light-collecting performance is satisfactory, then the light amount of the light beam passing through the pinhole is large, and hence the light amount of the reference light beam (generated spherical wave) is increased. On the other hand, when the aberration of the light flux coming into the pinhole is large, and the light-collecting performance is unsatisfactory, then the light amount of the light beam passing through the pinhole is small, and hence the light amount of the reference light beam (generated spherical wave) is decreased. Therefore, a problem arises such that any difference appears between the light amount of the reference light beam and the light amount of the measuring light beam, and the contrast of the interference fringes is consequently lowered.

Further, every time when the test sample is replaced with another test sample to perform the measurement, it is necessary that the test sample is subjected to the alignment (hereinafter appropriately referred to as "alignment for the test sample") with respect to the incoming or incident light beam coming into the test sample in order to allow the light beam having passed through the test sample to return to the pinhole, for the following reason. That is, the test sample represents a variety of optical members which involve different amounts of generated aberration respectively. Therefore, the light flux, which has passed through the test sample as described above, does not necessarily come into the pinhole, because the optical path, which is directed toward the pinhole, is changed due to the aberration and the refraction. For this reason, it is necessary that the test sample is subjected to the alignment three-dimensionally with respect to the incoming light beam so that the light beam, which has passed through the test sample, is accurately introduced into the minute pinhole. However, a problem arises such that it is extremely difficult to perform the three-dimensional alignment accurately in a short period of time. In this specification, the phrase "alignment for the test sample" is in a concept which includes not only the adjustment of the orientation or the position of the test sample with respect to the measuring light beam but also the adjustment of the angle or the position of the reflecting mirror which is provided in order to allow the light beam having passed through the test sample to return to the test sample.

DISCLOSURE OF THE INVENTION

The present invention has been made taking the foregoing problems into consideration, a first object of which is to provide a point diffraction interference measuring method and a point diffraction interference measuring apparatus capable of reducing any noise light beam which would be otherwise caused when a light flux is separated into a reference light beam and a measuring light beam to be used for the measuring method for measuring optical characteristics of a test sample.

A second object of the present invention is to provide a point diffraction interference measuring method and a point diffraction interference measuring apparatus which make it possible to perform the alignment for a test sample accurately in a short period of time so that a reference light beam having passed through the test sample reliably passes through a pinhole. A third object of the present invention is to provide a point diffraction interference measuring method and a point diffraction interference measuring apparatus in which a reference light beam is always introduced into a pinhole quickly and highly accurately even when a test sample is exchanged. A fourth object of the present invention is to provide a method for producing a projection lens in which the wavefront aberration is sufficiently reduced, especially a projection lens to be carried on an exposure apparatus.

According to a first aspect of the present invention, there is provided a point diffraction interference measuring method comprising:

a step of forming a substantially ideal spherical wave;

a step of dividing, into two light fluxes, a light flux obtained by passing the spherical wave through a test sample;

a step of passing one light flux of the two light fluxes through a pinhole to convert the one light flux into a reference light beam which is a substantially ideal spherical wave; and a step of detecting interference fringes generated by causing interference between the reference light beam and a measuring light beam which is the other light flux of the two light fluxes. According to the method of the present invention, it is possible to avoid the occurrence of any noise light beam by sufficiently separating the measuring light beam and the reference light beam from each other by using an optical path-dividing element without using any diffraction grating. In this method, the reference light beam passes along substantially the same optical path as that for the measuring light beam. Therefore, any influence, which is caused by the disturbance such as the vibration, is hardly exerted. It is possible to perform the highly accurate measurement. The optical path-dividing element may be a beam splitter or a prism.

According to a second aspect of the present invention, there is provided a point diffraction interference measuring method comprising:

a step of forming a substantially ideal spherical wave;

a step of dividing a light flux composed of the spherical wave into two light fluxes before passing the light flux through a test sample;

a step of passing one light flux of the two light fluxes through a pinhole to convert the one light flux into a reference light beam which is a substantially ideal spherical wave;

a step of passing only the other light flux of the two light fluxes through the test sample to obtain a measuring light beam; and a step of detecting interference fringes generated by causing interference between the reference light beam and the measuring light beam. In the method according to the second aspect of the present invention, the reference light beam does not pass through the test sample. Therefore, even when the test sample is replaced, the position of the reference light beam with respect to the pinhole is not varied. Therefore, the alignment can be performed extremely easily for the test sample, and the measurement can be performed in a short period of time.

The method according to the second aspect of the present invention may further comprise the steps of using a light source and a light source pinhole in order to form the substantially ideal spherical wave; and correcting a difference between an optical path length of the reference light beam from the light source to a section for detecting the interference fringes and an optical path length of the measuring light beam from the light source to the section for detecting the interference fringes to be within a coherent distance of a light beam coming from the light source.

According to a third aspect of the present invention, there is provided a point diffraction interference measuring method comprising:

a step of forming a light source spherical wave which is a substantially ideal spherical wave with a point light source-generating means;

a step of switching first measurement and second measurement, the first measurement including passing a light source light flux composed of the light source spherical wave through a test sample, thereafter dividing the light flux passed through the test sample into two light fluxes by using a first optical path-dividing element, passing one light flux of the light fluxes divided by the first optical path-dividing element through a first pinhole to convert the one light flux into a first reference light beam which is a substantially ideal spherical wave, and detecting first interference fringes generated by causing interference between the first reference light beam and a first measuring light beam which is the other light flux of the light fluxes divided by the first optical path-dividing element, and the second measurement including dividing the light source light flux into two light fluxes by using a second optical path-dividing element before passing the light source light flux through the test sample, passing one light flux of the light fluxes divided by the second optical path-dividing element through a second pinhole to convert the one light flux into a second reference light beam which is a substantially ideal spherical wave, passing only the other light flux of the light fluxes divided by the second optical path-dividing element through the test sample to obtain a second measuring light beam, and detecting second interference fringes generated by causing interference between the second reference light beam and the second measuring light beam; and a step of using information on the second interference fringes for alignment to be performed when the light flux, which is provided to obtain the first reference light beam of the light fluxes divided by the first optical path-dividing element, is allowed to come into the first pinhole for the first measurement. In the method according to the third aspect, it is possible to provide the advantages of the method according to the first aspect (measurement mode) and the method according to the second aspect (alignment mode). That is, even when the test sample is replaced, it is possible to perform the alignment for the test sample in a short period of time. Further, a highly accurate result is obtained, because the actual measurement is performed by using the reference light beam having passed through the test sample.

In the method according to the third aspect, a common pinhole may be used for both of the first pinhole and the second pinhole. Further, each of the first optical path-dividing element and the second optical path-dividing element may be a polarizing beam splitter.

The method according to the first or second aspect may further comprise a light amount-adjusting step of adjusting at least one of a light amount of the reference light beam and a light amount of the measuring light beam so that the light amount of the reference light beam is substantially equal to the light amount of the measuring light beam on a surface for detecting the interference fringes. In this case, the light amount-adjusting step may be performed by inserting a ½ wavelength plate into an optical path of the light flux before dividing the light flux, and rotating the ½ wavelength plate on the basis of at least one of the light amounts of the measuring light beam and the reference light beam passed through the pinhole. Further, the light amount-adjusting step may include a measuring step of at least one of a reference light amount-measuring step of measuring the light amount of the reference light beam passed through the pinhole at a position downstream from the pinhole and a measuring light amount-measuring step of measuring the light amount of the measuring light beam after dividing the light flux, and a wavelength plate-adjusting step of rotating the ½ wavelength plate on the basis of a result of at least one of the reference light amount-measuring step and the measuring light amount-measuring step.

The method according to the third aspect may further comprise a light amount-adjusting step of adjusting at least one of a light amount of the first reference light beam and a light amount of the first measuring light beam so that the light amount of the first reference light beam is substantially equal to the light amount of the first measuring light beam on a surface for detecting the interference fringes, and adjusting at least one of a light amount of the second reference light beam and a light amount of the second measuring light beam so that the light amount of the second reference light beam is substantially equal to the light amount of the second measuring light beam. In this case, the light amount-adjusting step may be such a step that a first ½ wavelength plate, which is arranged nearer to the point light source-generating means than the first optical path-dividing element, is rotated on the basis of at least one of the light amounts of the first measuring light beam and the first reference light beam passed through the first pinhole, and a second ½ wavelength plate, which is arranged nearer to the point light source-generating means than the second optical path-dividing element, is rotated on the basis of at least one of the light amounts of the second measuring light beam and the second reference light beam passed through the second pinhole. Further, the light amount-adjusting step may include a measuring step of at least one of a first reference light amount-measuring step of measuring the light amount of the first reference light beam passed through the first pinhole at a position nearer to a section for detecting the interference fringes than the first pinhole and a first measuring light amount-measuring step of measuring the light amount of the first measuring light beam at a position nearer to the section for detecting the interference fringes than the first optical path-dividing element, and a first wavelength plate-adjusting step of rotating the first ½ wavelength plate on the basis of a result of at least one of the first reference light amount-measuring step and the first measuring light amount-measuring step; and a measuring step of at least one of a second reference light amount-measuring step of measuring the light amount of the second reference light beam passed through the second pinhole at a position nearer to the section for detecting the interference fringes than the second pinhole and a second measuring light amount-measuring step of measuring the light amount of the second measuring light beam at a position nearer to the section for detecting the interference fringes than the second optical path-dividing element, and a second wavelength plate-adjusting step of rotating the second ½ wavelength plate on the basis of a result of at least one of the second reference light amount-measuring step and the second measuring light amount-measuring step.

According to a fourth aspect of the present invention, there is provided a point diffraction interference measuring apparatus comprising:

a point light source-generating unit which generates a spherical wave;

an optical path-dividing element which divides a light beam, which has been emitted from the point light source-generating unit and has passed through a test sample, into a measuring light beam and a reference light beam by reflection or refraction;

a pinhole which converts the reference light beam into a substantially ideal spherical wave; and an interference fringe-detecting section which detects interference fringes generated by causing interference between the measuring light beam and the reference light beam coming from the pinhole. This apparatus can be used to carry out the point diffraction interference measuring method according to the first aspect of the present invention.

According to a fifth aspect of the present invention, there is provided a point diffraction interference measuring apparatus comprising:

a point light source-generating unit which generates a spherical wave;

an optical path-dividing element which divides a light beam emitted from the point light source-generating unit into a reference light beam and a measuring light beam directed toward a test sample;

a pinhole which converts the reference light beam into a substantially ideal spherical wave; and an interference fringe-detecting section which detects interference fringes generated by causing interference between the measuring light beam coming from the test sample and the reference light beam coming from the pinhole. The apparatus according to the fifth aspect of the present invention can be used to carry out the point diffraction interference measuring method according to the second aspect of the present invention.

The point diffraction interference measuring apparatus according to the fourth or fifth aspect may further comprise a light amount-adjusting section which adjusts at least one of a light amount of the reference light beam and a light amount of the measuring light beam so that the light amount of the reference light beam passed through the pinhole is substantially equal to the light amount of the measuring light beam on a detecting surface of the interference fringe-detecting section. The light amount-adjusting section may include a ½ wavelength plate which is arranged nearer to the point light source-generating unit than the optical path-dividing element, and a rotating mechanism which rotates the ½ wavelength plate on the basis of at least one of the light amounts of the measuring light beam and the reference light beam passed through the pinhole. The point diffraction interference measuring apparatus may further comprise a reference light amount-measuring section which is arranged nearer to the interference fringe-detecting section than the pinhole and which measures the light amount of the reference light beam, and a measuring light amount-measuring section which is arranged nearer to the interference fringe-detecting section than the optical path-dividing element and which measures the light amount of the measuring light beam. The point diffraction interference measuring apparatus may further comprise an optical path length difference-correcting section which adjusts an optical path length of the reference light beam with respect to an optical path length of the measuring light beam.

According to a sixth aspect of the present invention, there is provided a point diffraction interference measuring apparatus comprising:

a point light source which generates a spherical wave;

an optical path-dividing element which divides a light beam emitted from the point light source into a reference light beam and a measuring light beam which passes through a test sample;

a pinhole which converts the reference light beam into a substantially ideal spherical wave;

an optical path-switching unit which switches an optical path for the reference light beam into a first reference optical path for making introduction into the pinhole via the test sample and a second reference optical path for making introduction into the pinhole without passing through the test sample; and an interference fringe-detecting unit which detects interference fringes generated by causing interference between the measuring light beam and the reference light beam coming from the pinhole. The interference measuring apparatus according to the sixth aspect of the present invention comprises the optical path-switching unit for the reference light beam, for example, a shutter for opening/closing the optical paths for the first reference optical path and the second reference optical path. Therefore, the alignment can be executed with ease by using the second reference optical path during the alignment for the test sample, while the optimum interference fringes having satisfactory contrast can be observed without being affected by any disturbance by using the first reference optical path when the wavefront aberration of the test sample is measured. The interference measuring apparatus according to the sixth aspect may further comprise an optical path length difference-correcting section which adjusts an optical path length of the reference light beam with respect to an optical path length of the measuring light beam.

According to a seventh aspect of the present invention, there is provided an interference measuring method for measuring an optical characteristic of a test sample placed on a measuring optical path by using an interference measuring apparatus including a point light source which generates a substantially ideal spherical wave, a dividing element which divides the spherical wave into a reference light beam and a measuring light beam which passes through the test sample, a pinhole which converts the reference light beam into an ideal spherical wave, and a detector which detects interference between the measuring light beam and the reference light beam passed through the pinhole, the interference measuring method comprising:

a first step of passing the reference light beam and the measuring light beam through the measuring optical path in a state in which the test sample is absent in the measuring optical path and adjusting the reference light beam and the measuring light beam to obtain optimum interference fringes;

a second step of placing the test sample in the measuring optical path and changing an optical path for the reference light beam so that the reference light beam passes through the pinhole without passing through the measuring optical path;

a third step of performing alignment for the test sample relative to the measuring optical path so that a state, which is most approximate to the interference fringes obtained in the first step, is obtained after changing the optical path for the reference light beam in the second step; and a fourth step of changing the optical path so that the reference light beam passes through the measuring optical path in a state in which the alignment has been performed in the third step to observe the interference fringes in this state. When this method is used, the alignment can be performed for the test sample with ease, even when the test sample, which has any unknown optical characteristic, is inserted into the measuring optical path. When the wavefront aberration of the test sample is actually measured, the reference light beam passes through the measuring optical path, i.e., the reference light beam passes through the test sample. Therefore, it is possible to observe the interference fringes highly accurately without being affected by the disturbance.

According to a seventh aspect of the present invention, there is provided a method for producing a projection lens, comprising:

measuring wavefront aberration of the projection lens in accordance with the method as defined in the first, second, or sixth aspect of the present invention by using the projection lens as the test sample; and reprocessing the projection lens on the basis of a measurement result of the measured wavefront aberration. According to this method, it is possible to obtain the projection lens in which the wavefront aberration is adjusted highly accurately. This method is extremely useful for the production of the projection lens to be used for the exposure apparatus, especially for the exposure apparatus which uses the light source of a laser beam having a short wavelength such as ultraviolet light.

BEST MODE FOR CARRYING OUT THE INVENTION

Point diffraction interference measuring apparatuses according to respective embodiments of the present invention will be explained below on the basis of the accompanying drawings.

First Embodiment

Figure 1:
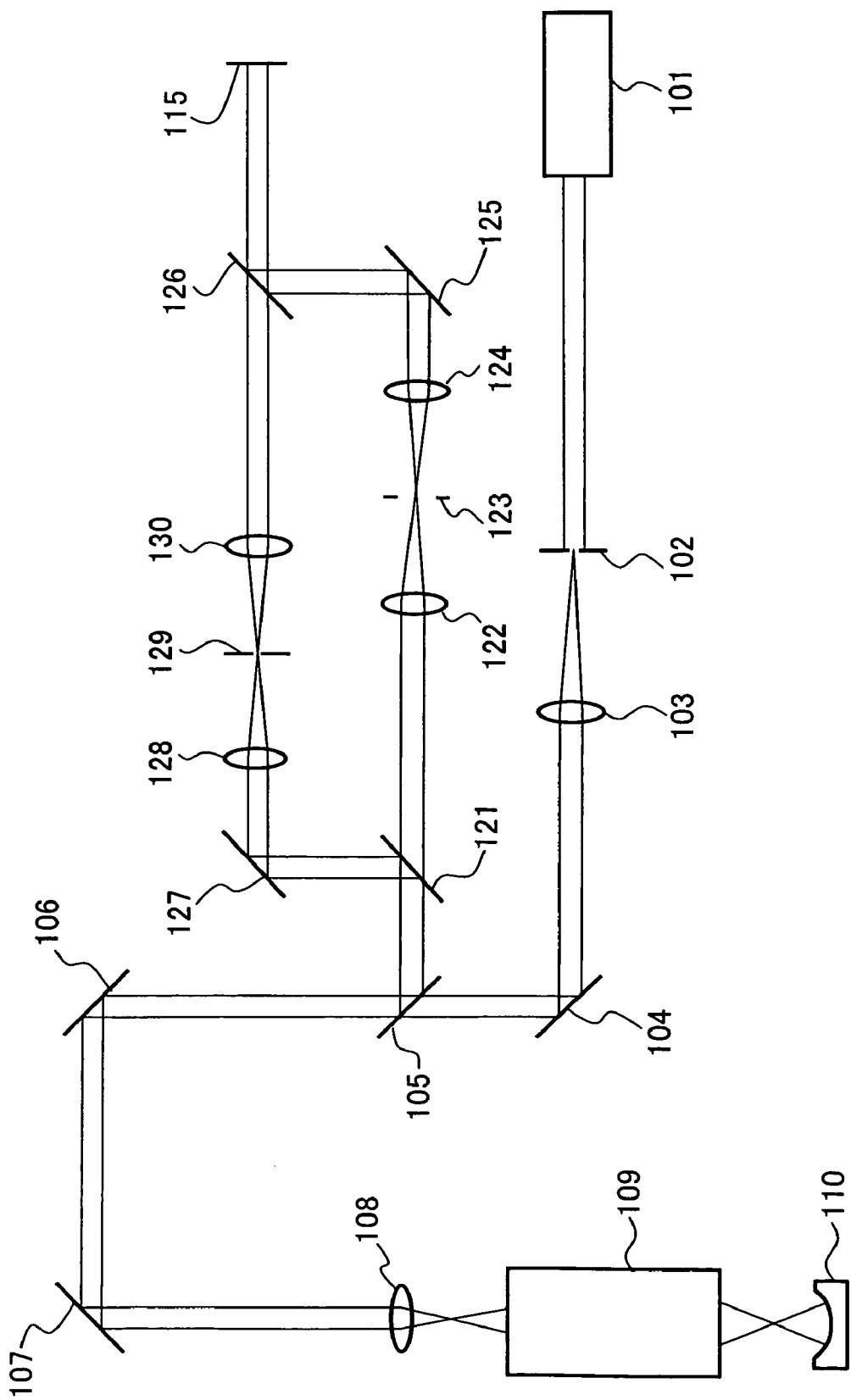
FIG. 1 schematically shows an arrangement of a point diffraction interference measuring apparatus according to a first embodiment of the present invention.

FIG. 1 schematically shows an arrangement of a point diffraction interference measuring apparatus according to a first embodiment of the present invention. With reference to FIG. 1, a light flux (ultraviolet light), which is emitted from a light source 101, illuminates a light source pinhole 102. In this arrangement, the light beam, which has outgone from the light source pinhole 102, can be regarded as a substantially ideal spherical wave. The spherical wave, which has outgone from the light source pinhole 102, passes across a collimator lens 103, a bending mirror 104, a half mirror 105, a bending mirror 106, a bending mirror 107, and a light-collecting lens 108 successively in this order from the side of the light source 101. The light beam, which has outgone from the light-collecting lens 108, is transmitted through a test sample 109, and the light beam is reflected by a returning reflecting mirror 110. In this arrangement, the optical path, which is disposed between the light-collecting lens 108 and the returning reflecting mirror 110, is the measuring optical path in which the test sample is installed. The reflected light flux passes again across the test sample 109, the light-collecting lens 108, the bending mirror 107, and the bending mirror 106 successively in this order from the side of the returning reflecting mirror 110. The light beam, which has passed across the bending mirror 106, is reflected by the half mirror 105 toward a half mirror 121.

The light beam, which has come into the half mirror 121, is divided into two light fluxes by the half mirror 121. One light flux of the divided light fluxes passes across a light-collecting lens 122, an aperture diaphragm 123, a collimator lens 124, and a bending mirror 125, and then the light flux comes into a half mirror 126. The other light flux of the divided light fluxes passes across a bending mirror 127 and a light-collecting lens 128, and then the light flux comes into a reference light beam pinhole 129. The light beam, which has outgone from the reference light beam pinhole 129, can be regarded as a substantially ideal spherical wave, and hence it serves as a reference light beam. The reference light beam passes across the collimator lens 130, and then the reference light beam comes into the half mirror 126. The divided two optical paths form the branched optical paths of the Mach-Zehnder type composed of the two half mirrors 121, 126 and the two bending mirrors 125, 127.

The two light fluxes, which have come into the half mirror 126, are overlaid by the half mirror 126. The overlaid light beam comes into an interference fringe-detecting section 115 such as CCD which is capable of performing the image analysis in accordance with the computer control to form interference fringes on the interference fringe-detecting section 115. The transmission wavefront aberration of the test sample 109 is calculated on the basis of the phase difference of the interference fringes by the aid of the interference fringe-detecting section 115. When CCD is used as the interference fringe-detecting section 115 as described above, for example, the interference fringes are analyzed in relation to the uniformity of brightness and darkness of the entire image.

As described above, the measuring light beam and the reference light beam are separated from each other by means of the half mirror in the point diffraction interference measuring apparatus according to this embodiment. Accordingly, the occurrence of any noise light beam, which has been hitherto caused by the separation with the diffraction grating as described above, can be avoided.

Second Embodiment

Figure 2:
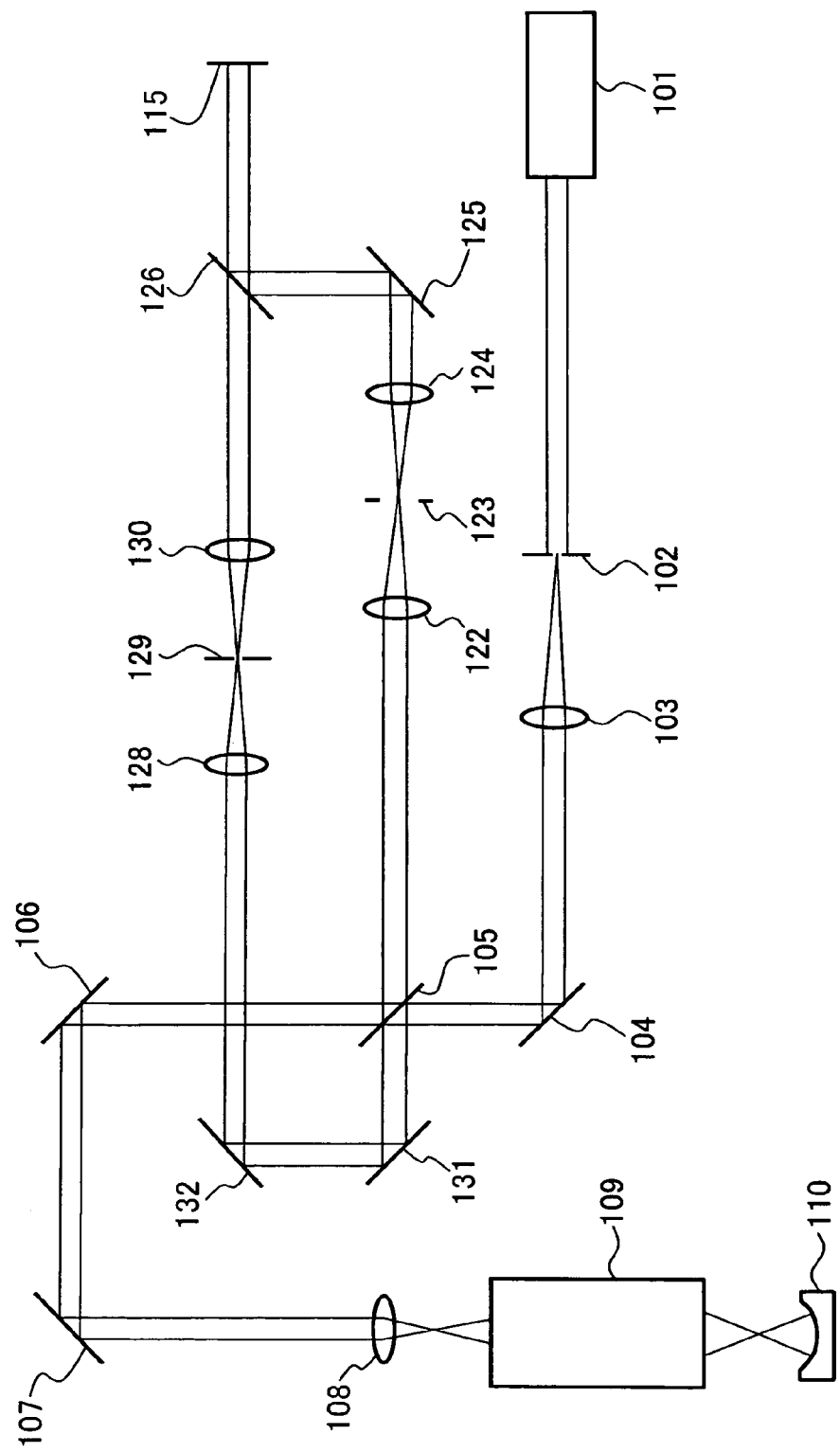
FIG. 2 schematically shows an arrangement of a point diffraction interference measuring apparatus according to a second embodiment of the present invention.

FIG. 2 schematically shows an arrangement of a point diffraction interference measuring apparatus according to a second embodiment of the present invention. With reference to FIG. 2, a light flux (ultraviolet light), which is emitted from a light source 101, illuminates a light source pinhole 102. In this arrangement, the light beam, which has outgone from the light source pinhole 102, can be regarded as a substantially ideal spherical wave. The spherical wave, which has outgone from the light source pinhole 102, passes across a collimator lens 103 and a bending mirror 104, and then it comes into a half mirror 105. The light beam, which has come into the half mirror 105, is divided into two light fluxes by the half mirror 105. One light flux of the divided light fluxes passes across a bending mirror 106, a bending mirror 107, and a light-collecting lens 108 successively in this order from the side of the light source 101. The light beam, which has outgone from the light-collecting lens 108, is transmitted through a test sample 109, and the light beam is reflected by a returning reflecting mirror 110. The reflected light flux again passes across the test sample 109, the light-collecting lens 108, the bending mirror 107, and the bending mirror 106 successively in this order from the side of the returning reflecting mirror 110. The light beam, which has passed across the bending mirror 106, is reflected by the half mirror 105 toward a light-collecting lens 122. The light beam, which is reflected by the half mirror 105, passes across a light-collecting lens 122, an aperture diaphragm 123, a collimator lens 124, and a bending mirror 125. The light beam, which has passed across the bending mirror 125, comes into a half mirror 126.

The other light flux of the light fluxes having been divided by the half mirror 105 passes across a bending mirror 131, a bending mirror 132, and a light-collecting lens 128, and then it comes into a reference light beam pinhole 129. The light beam, which has outgone from the reference light beam pinhole 129, can be regarded as a substantially ideal spherical wave. Therefore, this light beam serves as a reference light beam. The reference light beam passes across a collimator lens 130, and then it comes into a half mirror 126. Also in this embodiment, the divided two optical paths form the branched optical paths of the Mach-Zehnder type.

The two light fluxes, which have come into the half mirror 126, are overlaid by the half mirror 126. The overlaid light flux comes into an interference fringe-detecting section 115 to form interference fringes on the interference fringe-detecting section 115. The transmission wavefront aberration of the test sample is calculated on the basis of the phase difference of the interference fringes by the aid of the interference fringe-detecting section 115.

As described above, in the point diffraction interference measuring apparatus according to this embodiment, it is possible to avoid the occurrence of any noise light beam in the same manner as in the effect obtained in the first embodiment. Further, in the point diffraction interference measuring apparatus according to this embodiment, the light beam, which comes from the light source 101, is divided by the half mirror 105 into the light flux for the reference light beam and the light flux for the measuring light beam as described above. The light flux for the reference light beam passes across the reference light beam pinhole 129 without passing across the test sample 109, and it serves as the reference light beam. Therefore, the light flux for the reference light beam can be allowed to accurately come into the reference light beam pinhole 129 irrelevant to the test sample 109. Further, the reference light beam always comes into the interference fringe-detecting section 115. Accordingly, when the test sample 109 is inserted, it is possible to necessarily observe any interference fringe. Therefore, it is easy to perform the alignment adjustment in order to obtain the interference fringes optimum for the measurement.

Third Embodiment

Figure 3:
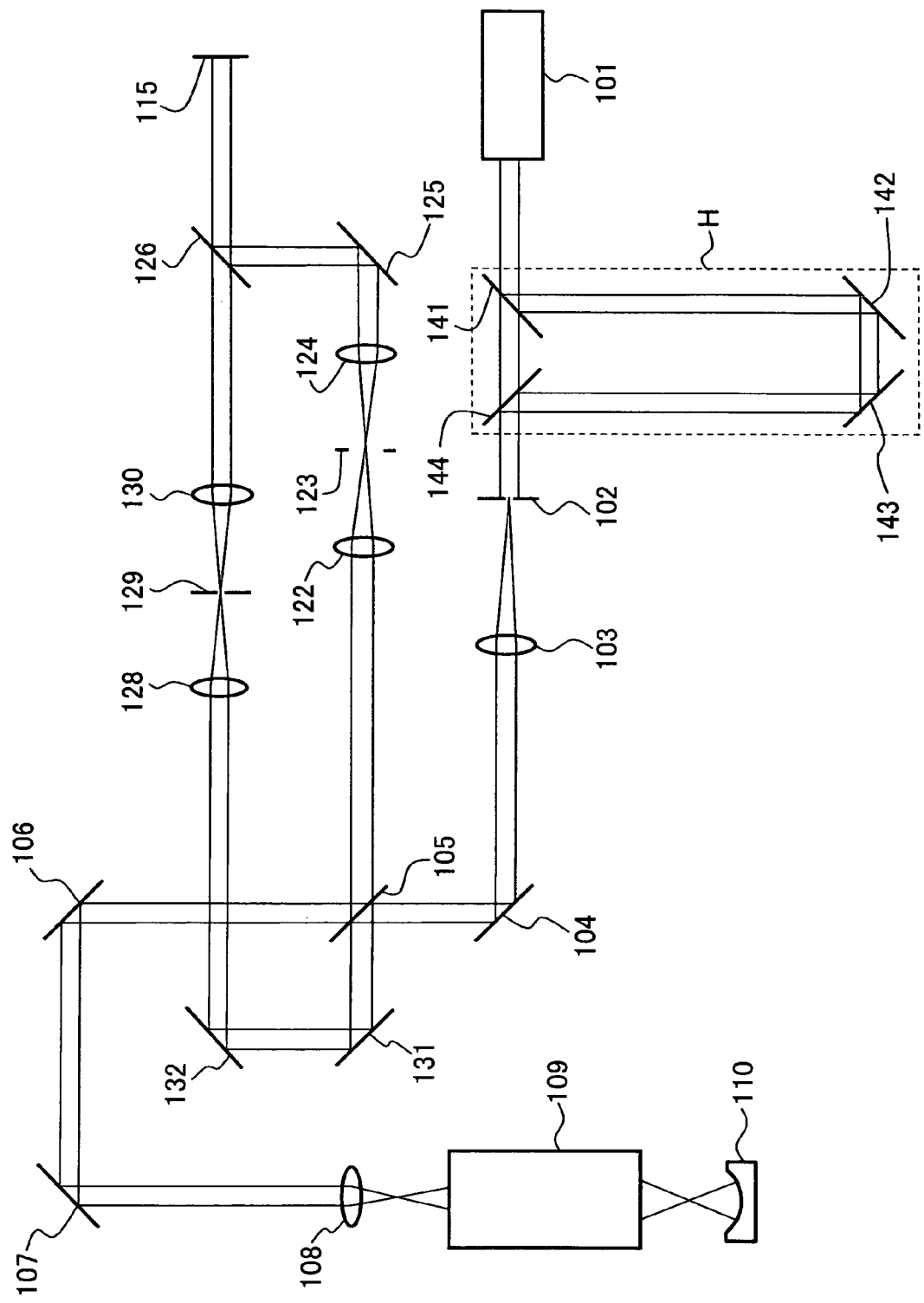
FIG. 3 schematically shows an arrangement of a point diffraction interference measuring apparatus according to a third embodiment of the present invention.

FIG. 3 schematically shows an arrangement of a point diffraction interference measuring apparatus according to a third embodiment of the present invention. Components or parts, which are constructed in the same manner as those in the second embodiment described above, are designated by the same reference numerals to omit any duplicate explanation. Characteristic components or parts will be explained in detail below.

In the second embodiment described above, the optical path length of the light flux for the reference light beam which does not pass through the test sample 109 is shorter than the optical path length of the light flux for the measuring light beam which passes through the test sample 109. The point diffraction interference measuring apparatus according to this embodiment comprises an optical path length difference-correcting section H which is disposed between the light source 101 and the light source pinhole 102 in order to correct the difference in optical path length to be within the coherent distance of the light source light beam. The optical path length difference-correcting section H includes half mirrors 141, 144 and bending mirrors 142, 143. In this embodiment, the optical path length difference-correcting section H is arranged at a position nearer to the light source as compared with the light source pinhole 102. Therefore, the light flux may be varied and/or the wavefront aberration may occur on account of, for example, the inclinations of the bending mirrors 142, 143. On the other hand, in order to measure the optical characteristics of the test sample, it is recommended that the light beam, which is to come into the test sample, is an ideal spherical wave without any aberration. Therefore, the light source pinhole 102 is provided downstream from the optical path length difference-correcting section H so that the aberration, which is caused by the light beam having passed across the optical path length difference-correcting section H, is canceled to generate the ideal spherical wave from the pinhole 102. The optical path length difference-correcting section H is capable of adjusting the optical path length in the optical path length difference-correcting section H in conformity with the test sample 109. Owing to this construction, it is possible to correct the optical path length difference even when the optical path length difference is different between the light flux for the reference light beam and the light flux for the measuring light beam depending on each test sample.

The light flux is separated by the half mirror 141 into two light fluxes which are directed toward the half mirror 144 and the bending mirror 142 respectively. In this arrangement, the light beam, which is transmitted through the half mirror 141 and which is directed toward the half mirror 144, is transmitted through the half mirror 144, and then the light beam is divided by a half mirror 105 into the reference light beam and the measuring light beam. On the other hand, the light beam, which is reflected by the half mirror 141, which passes across the bending mirrors 142, 143, and which is reflected by the half mirror 144, is also divided by the half mirror 105 into the reference light beam and the measuring light beam. In particular, the light flux for the measuring light beam having been transmitted through the half mirror 144 and the reference light beam having been reflected by the half mirror 144 have the difference between the optical path lengths of the light fluxes which is corrected to be within the coherent distance owing to the presence of the optical paths passing across the bending mirrors 142, 143. Therefore, only the light beam for the measuring light beam having been transmitted through the half mirror 144 and the reference light beam having been reflected by the half mirror 144 contribute to the interference caused in the interference fringe-detecting section 115. According to this fact, it can be regarded that the light beam from the light source 101 is substantially separated by the half mirror 141 into the light flux for the reference light beam and the light flux for the measuring light beam. The optical path length difference-correcting section H functions as a coherent distance-adjusting mechanism by regulating the optical paths passing across the bending mirrors 142, 143.

As described above, in the point diffraction interference measuring apparatus according to this embodiment, the difference in optical path length between the light flux for the reference light beam and the light flux for the measuring light beam can be corrected to be within the coherent distance in addition to the effect obtained in the second embodiment described above.

Fourth Embodiment

Figure 4:
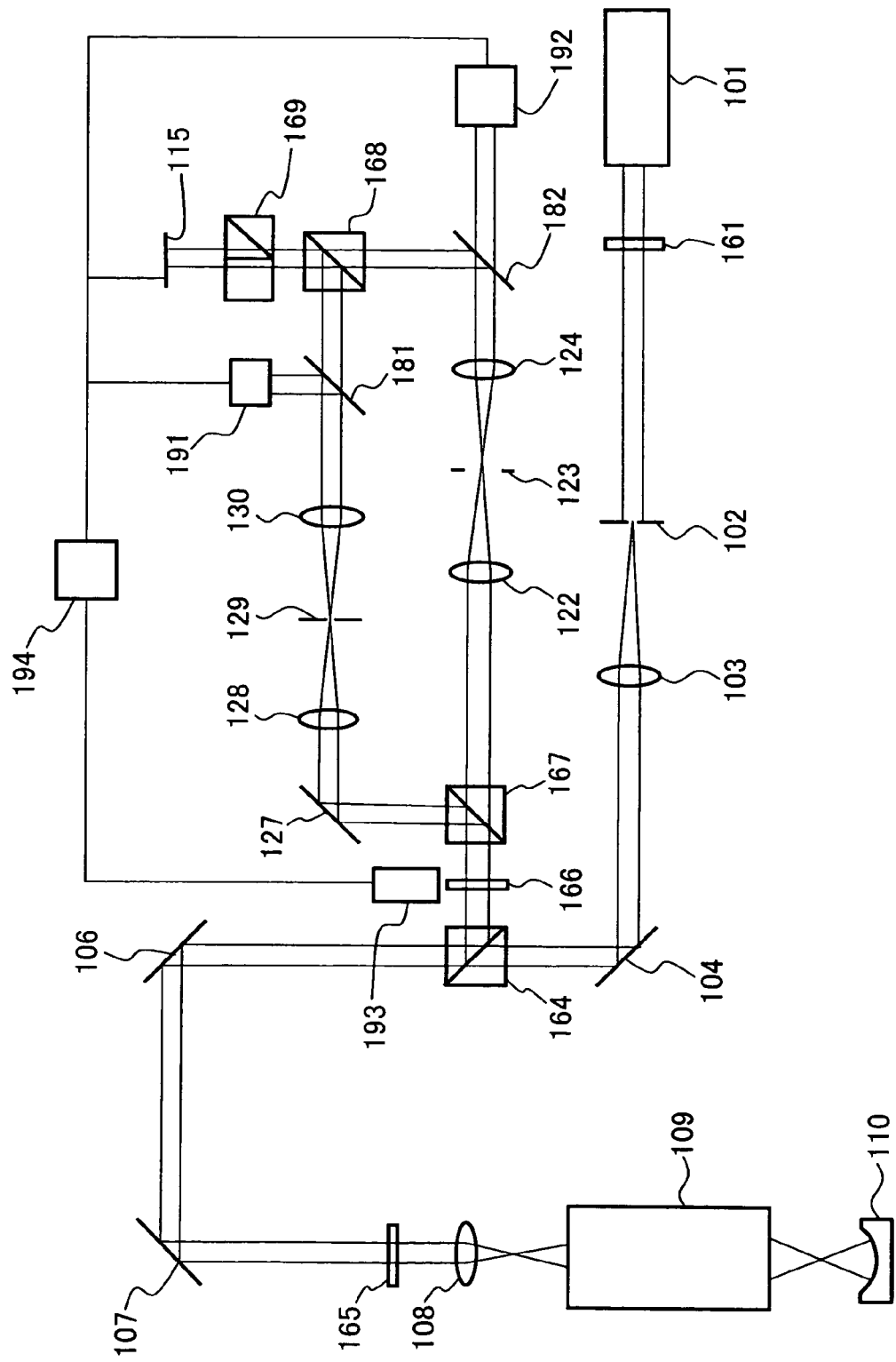
FIG. 4 schematically shows an arrangement of a point diffraction interference measuring apparatus according to a fourth embodiment of the present invention.

FIG. 4 schematically shows an arrangement of a point diffraction interference measuring apparatus according to a fourth embodiment of the present invention. With reference to FIG. 4, a light flux of ultraviolet light, which is a linearly polarized light beam emitted from a light source 101, is transmitted through a ½ wavelength plate 161, and the light flux illuminates a light source pinhole 102. The light beam, which has passed through the light source pinhole 102, passes across a collimator lens 103, a bending mirror 104, a polarizing beam splitter 164, a bending mirror 106, and a bending mirror 107 successively in this order from the side of the light source 101, and the light beam comes into a ¼ wavelength plate 165. In this arrangement, the light beam is converted into a circularly polarized light beam by being transmitted through the ¼ wavelength plate 165. The circularly polarized light beam, which has outgone from the ¼ wavelength plate 165, passes across a light-collecting lens 108 and a test sample 109, and the light beam is reflected by a returning reflecting mirror 110. The reflected light beam again passes across the test sample 109 and the light-collecting lens 108, and then the light beam comes into the ¼ wavelength plate 165. In this arrangement, the light flux is converted by the ¼ wavelength plate 165 into a linearly polarized light beam in which the direction of polarization is rotated by 90 degrees. The linearly polarized light beam, which has outgone from the ¼ wavelength plate 165, passes across the bending mirror 107 and the bending mirror 106, and the light beam comes into the polarizing beam splitter 164. The linearly polarized light beam is reflected by the polarizing beam splitter 164, and the light beam is transmitted through a ½ wavelength plate 166 to come into a polarizing beam splitter 167. As for this light flux, the orientation of polarization is rotated by the ½ wavelength plate 166. The P-polarized light beam and the S-polarized light beam, which are included in the light flux having come into the polarizing beam splitter 167, are transmitted through and reflected by the polarizing beam splitter 167 respectively to make division into two optical paths.

The light flux of the P-polarized light beam, which has been transmitted through the polarizing beam splitter 167, passes across a light-collecting lens 122, an aperture diaphragm 123, a collimator lens 124, and a beam splitter 182, and then the light flux comes into a polarizing beam splitter 168. In this arrangement, the P-polarized light beam, which has come into the polarizing beam splitter 168, serves as the measuring light beam.

On the other hand, the S-polarized light beam, which has been reflected by the polarizing beam splitter 167, passes across the bending mirror 127 and the light-collecting lens 128, and then it comes into a reference light beam pinhole 129. The light beam, which has outgone from the reference light beam pinhole 129, can be regarded as a substantially ideal spherical wave. Therefore, this light beam serves as the reference light beam. The reference light beam passes across a collimator lens 130 and a beam splitter 181, and then it comes into a polarizing beam splitter 168. The divided two optical paths form the branched optical paths of the Mach-Zehnder type.

The two light fluxes, which have come into the polarizing beam splitter 168, are overlaid by the polarizing beam splitter 168. The overlaid light beam does not generate any interference fringe as it is because of the orthogonal orientation of the polarization. Therefore, the overlaid light beam passes across a polarizing beam splitter 169 which is rotated by 45 degrees about the optical axis with respect to the polarizing beam splitter 168, and then the light beam comes into an interference fringe-detecting section 115. Interference fringes are formed on the interference fringe-detecting section 115, and the transmission wavefront aberration of the test sample is calculated on the basis of the phase difference of the interference fringes.

Next, an explanation will be made about most characteristic features of the point diffraction interference measuring apparatus according to this embodiment. In the point diffraction interference measuring apparatus according to this embodiment, the ½ wavelength plate 166 is rotatable about the center of the optical axis, for example, with the aid of a rotating mechanism 193 such as a lever attached around the ½ wavelength plate 166. The rotating mechanism 193 is capable of rotating the ½ wavelength plate 166, and thus it is possible to regulate the orientation of polarization of the light beam outgoing from the ½ wavelength plate 166. The polarizing beam splitter makes the division into the P-polarized light beam and the S-polarized light beam at a light amount ratio depending on the orientation of polarization of the light beam. Accordingly, it is possible to regulate the light amount ratio between the S-polarized light beam (light beam to come into the reference light beam pinhole 129) and the P-polarized light beam (measuring light beam) subjected to the division effected by the polarizing beam splitter 167.

As described above, the light beam (reference light beam), which has passed across the reference light beam pinhole 129, passes across the beam splitter 181. In this situation, a part of the reference light beam is reflected by the beam splitter 181. A light-receiving element 191 detects the reflected part of the reference light beam to measure the light amount thereof.

The light beam (measuring light beam), which has been transmitted through the polarizing beam splitter 167, passes across the beam splitter 182. In this situation, a part of the measuring light beam is transmitted through the beam splitter 182. A light-receiving element 192 detects the transmitted part of the measuring light beam to measure the light amount thereof.

A calculation control unit 194 calculates the light amount ratio between the reference light beam and the measuring light beam on the basis of results of the measurement performed by the light-receiving elements 191, 192. The calculation control unit 194 rotates the ½ wavelength plate 166 by the aid of the rotating mechanism 193 so that the light amount ratio between the reference light beam and the measuring light beam has a predetermined value. The control of the light amount ratio, which is effected by the calculation control unit 194, is automatically performed at predetermined timings so that the contrast of the interference fringes is prevented from being extremely lowered. Owing to this arrangement, it is possible to maintain the high contrast interference fringes irrelevant to the aberration of the measuring light beam even when the aberration of the light flux coming into the reference light beam pinhole 129 is large and the light amount of the reference light beam is decreased.

In a preferred embodiment of this embodiment, it is desirable that a light amount-regulating member such as a filter is arranged in the optical path between the polarizing beam splitter 167 and the beam splitter 182. When the light amount of the measuring light beam is larger than the light amount of the reference light beam, the light amount-regulating member can be used to suppress the light amount of the measuring light beam down to a predetermined value.

Further, in the point diffraction interference measuring apparatus according to this embodiment, the optical path is divided by using the polarizing beam splitter. However, even in the case of a point diffraction interference measuring apparatus in which the optical path is divided by using a half mirror, it is also possible to regulate the light amount ratio between the reference light beam and the measuring light beam by arranging the light amount-regulating member as described above.

The point diffraction interference measuring apparatus according to this embodiment is constructed such that both of the light amount of the reference light beam and the light amount of the measuring light beam are measured by using the light-receiving elements 191, 192. However, the apparatus may be constructed such that any one of the light amounts is measured. Further, the apparatus may be constructed such that the light amount of the reference light beam and the light amount of the measuring light beam are measured with the aid of the interference fringe-detecting section 115. That is, in the interference fringe-detecting section 115, the sum (absolute light amount) of the measuring light beam and the reference light beam is obtained, and the light amount ratio between the measuring light beam and the reference light beam is detected as the contrast. Therefore, the light amounts of the reference light beam and the measuring light beam can be determined respectively from the absolute light amount and the contrast.

The characteristic features of this embodiment as described above can be applied to the point diffraction interference measuring apparatuses according to the respective embodiments described above and respective embodiments described later on.

As described above, in the point diffraction interference measuring apparatus according to this embodiment, an effect is provided such that the high contrast interference fringes can be obtained with ease in addition to the effect provided by the respective embodiments.

Further, when the point diffraction interference measuring apparatus according to each of the embodiments described above is used, it is possible to measure the interference of the wavefront aberration of an objective lens accurately and conveniently. Accordingly, it is possible to produce the highly accurate projection lens.

Fifth Embodiment

Figure 5:
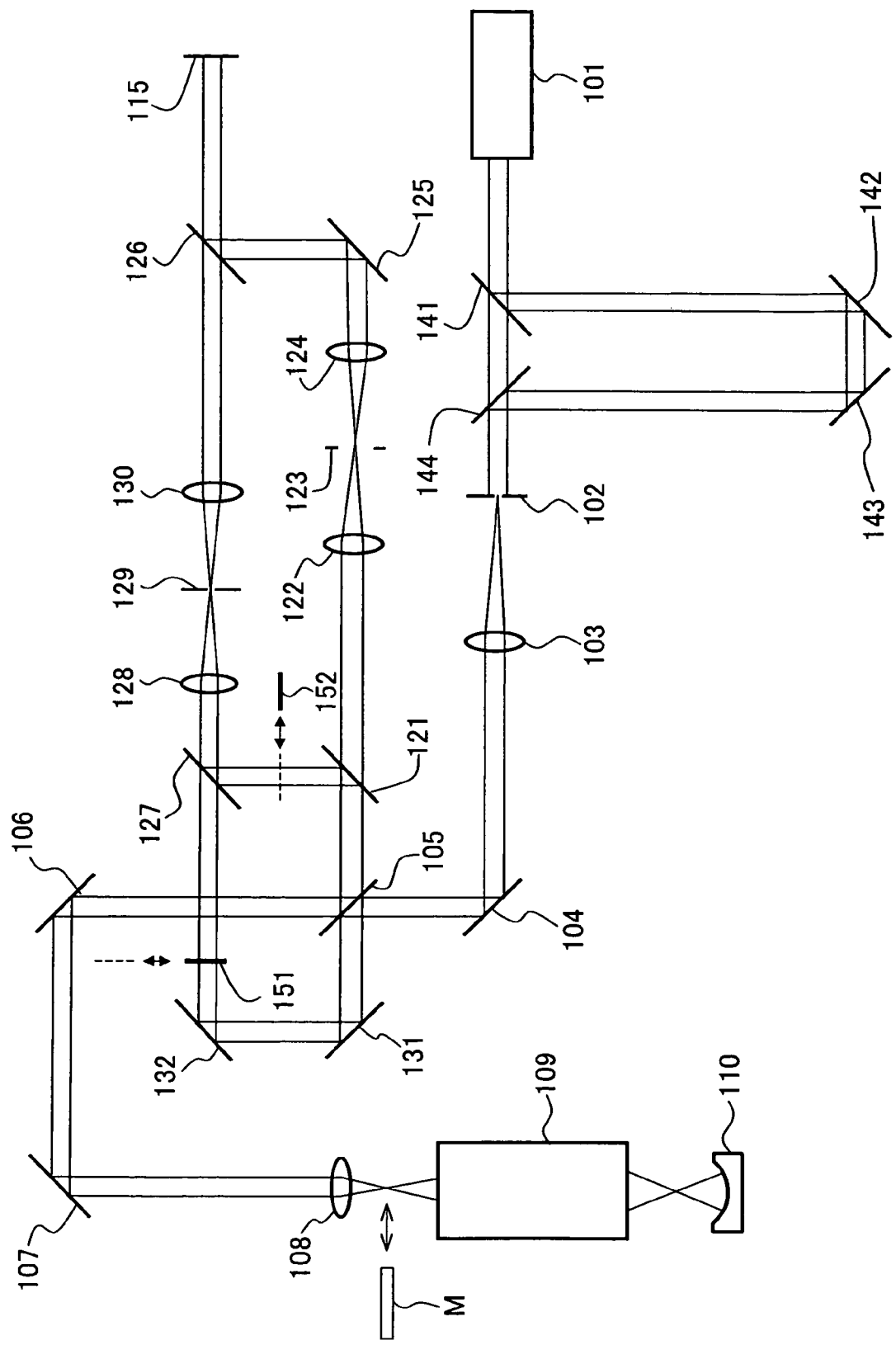
FIG. 5 schematically shows an arrangement of a point diffraction interference measuring apparatus according to a fifth embodiment of the present invention.

FIG. 5 schematically shows an arrangement of a point diffraction interference measuring apparatus according to a fifth embodiment of the present invention. The point diffraction interference measuring apparatus according to this embodiment makes it possible to perform the measurement with the point diffraction interference measuring apparatus according to the first embodiment (hereinafter referred to as "measurement mode") and the measurement with the point diffraction interference measuring apparatus according to the third embodiment (hereinafter referred to as "alignment mode").

As shown in FIG. 5, in the point diffraction interference measuring apparatus according to this embodiment, the optical path for the measuring light beam in the measurement mode is common to the optical path for the measuring light beam in the alignment mode. Further, the optical path for the reference light beam ranging from the reference light beam pinhole 129 to the interference fringe-detecting section 115 in the measurement mode is common to the optical path for the reference light beam ranging from the reference light beam pinhole 129 to the interference fringe-detecting section 115 in the alignment mode. In this arrangement, the measurement mode and the alignment mode can be switched to one another by alternately inserting and withdrawing shutters 151, 152 with respect to the optical paths. When the measurement is performed in accordance with the measurement mode, then the shutter 151 is inserted into the optical path, and the shutter 152 is retracted to the outside of the optical path. When the measurement is performed in accordance with the alignment mode, then the shutter 151 is retracted to the outside of the optical path, and the shutter 152 is inserted into the optical path.

As described in the first embodiment, the light beam, which has passed through the test sample 109, is divided into the reference light beam and the measuring light beam in the measurement mode. Therefore, when the test sample 109 is adjusted, both of the reference light beam and the measuring light beam are varied simultaneously. Therefore, when any disturbance such as the vibration of the apparatus system occurs, both of the measuring light beam and the reference light beam are affected to approximately the same extent. Therefore, it is easy to cancel the influence of the disturbance as described above in order to determine the aberration of the test sample. On the other hand, the light beam, which does not pass through the test sample 109, is converted into the reference light beam in the alignment mode. Therefore, only the measuring light beam is varied when the test sample 109 is adjusted. Therefore, the measurement can be performed highly accurately in the measurement mode as compared with the alignment mode. According to the fact as described above, the point diffraction interference measuring apparatus according to the first embodiment (measurement mode) is principally used for the measurement.

As described in the second embodiment, the reference light beam always comes into the interference fringe-detecting section in the alignment mode. Therefore, when the test sample 109 is inserted, any interference fringe can be necessarily observed. It is easy to perform the alignment adjustment for the test sample 109 in order to obtain the interference fringes optimum for the measurement. According to the fact as described above, the point diffraction interference measuring apparatus according to the second embodiment (alignment mode) is principally used for the alignment adjustment for the test sample 109.

An explanation will be made in detail below about the procedure of the interference measurement and the alignment adjustment to be performed as a previous stage of the interference measurement. With the arrangement as described above, in order to form the interference fringes having good contrast on the interference fringe-detecting section 15, the alignment adjustment for the test sample 109 is performed in accordance with the following procedure.

Procedure (1) In the measurement mode, a returning mirror M is inserted into the optical path between the light-collecting lens 108 and the test sample 109 in place of the test surface (sample). In this situation, the optimum interference fringe state, which can be brought about by the optical system shown in FIG. 5, is unknown.

(2) The position of the returning mirror M is adjusted three-dimensionally so that the contrast is satisfactory to give the interference fringes in the state optimum for the measurement. More specifically, the position of the mirror M is adjusted three-dimensionally to give the state in which the best interference fringes to be successfully formed by the optical arrangement of the apparatus shown in FIG. 5 are obtained, specifically to obtain the most ideal interference fringes formed such that the reference light beam having a sufficient light amount passes across the pinhole 129 to mutually cause the interference between the reference light beam and the measuring light beam thereby. The power component and the tilt component (alignment information) in the phase difference between the measuring light beam and the reference light beam are determined with the aid of the computer analysis from the result of the measurement of the most ideal interference fringes obtained by the adjustment, which are stored as base (target) data in the analyzing computer equipped for the interference fringe-detecting section 115.

(3) The returning mirror M is retracted to the outside of the optical path, and the test sample 109 is installed in the optical path between the lens 108 and the reflecting mirror 110. As a result of the installation of the test sample in the optical path, a discrepancy (discrepancy in light-collecting position) in the optical axis direction of the measuring light beam in the state of the adjustment of (2) and a positional discrepancy (discrepancy in light-collecting position) in the direction perpendicular to the optical axis arise.

(4) Switching is made to the alignment mode. In the alignment mode, the reference light beam must pass through the pinhole 129 reliably because the reference light beam is not transmitted through the test sample. In this state, any interference fringe appears. However, the discrepancy arises from the optical path (light-collecting position) adjusted in (2) as described above as a result of the transmission of the measuring light beam through the test sample. Therefore, it is not affirmed that the best interference fringes are obtained when the switching is made to the measurement mode in this state.

(5) The power component and the tilt component (alignment information) in the phase difference between the measuring light beam and the reference light beam are determined with the aid of the computer analysis by analyzing the interference fringes appeared in (4). In this case, the power component refers to the shift of the wavefront central point in the optical axis direction caused, for example, by the shift of the test sample 109 in the optical axis direction. The tilt component refers to the shift of the wavefront central point in the direction perpendicular to the optical axis caused, for example, by the shift of the test sample 109 in the direction perpendicular to the optical axis.

(6) The returning mirror 110 is adjusted three-dimensionally on the basis of the alignment information (power component and tilt component) determined in (5) so that the power component and the tilt component (base data) of the interference fringes in the state optimum for the measurement adjusted in (2) are obtained. According to this adjustment, the light-collecting position of the measuring light beam having been transmitted through the test sample is adjusted to form the best interference fringes even in the state in which the test sample is inserted.

(7) Switching is made to the measurement mode. In this situation, the interference fringes in the state optimum for the measurement appear. Therefore, the interference fringes are subjected to the interference measurement. In this state, the measuring light beam and the reference light beam are adjusted to reside in the optical path and the light-collected position so that the base data of the best interference fringes determined in the step (1) is obtained, for the following reason. That is, in the point diffraction interference measuring apparatus according to this embodiment, the optical path for the measuring light beam in the measurement mode is common to the optical path for the measuring light beam in the alignment mode, and hence the interference fringes, which are obtained by performing the alignment adjustment in the alignment mode, can be obtained exactly as they are even when the switching is made to the measurement mode. When the operation as described above is executed, the best interference fringes, which can be produced with the optical system shown in FIG. 5, can be obtained in an extremely short period of time with the simple operation, even when the test sample having unknown optical characteristics is inserted into the optical path. Accordingly, it is possible to further simplify the interference measurement.

In this procedure, in principle, it is enough that each of the steps (1), (2), and (3) is performed only once for the apparatus irrelevant to the test sample 109.

As described above, in the point diffraction interference measuring apparatus according to this embodiment, it is possible to perform the alignment adjustment easily in a short period of time when the light flux for the reference light beam is allowed to come into the pinhole 129 in the measurement mode. Further, it is possible to perform the highly accurate interference measurement.

Sixth Embodiment

Figure 6:
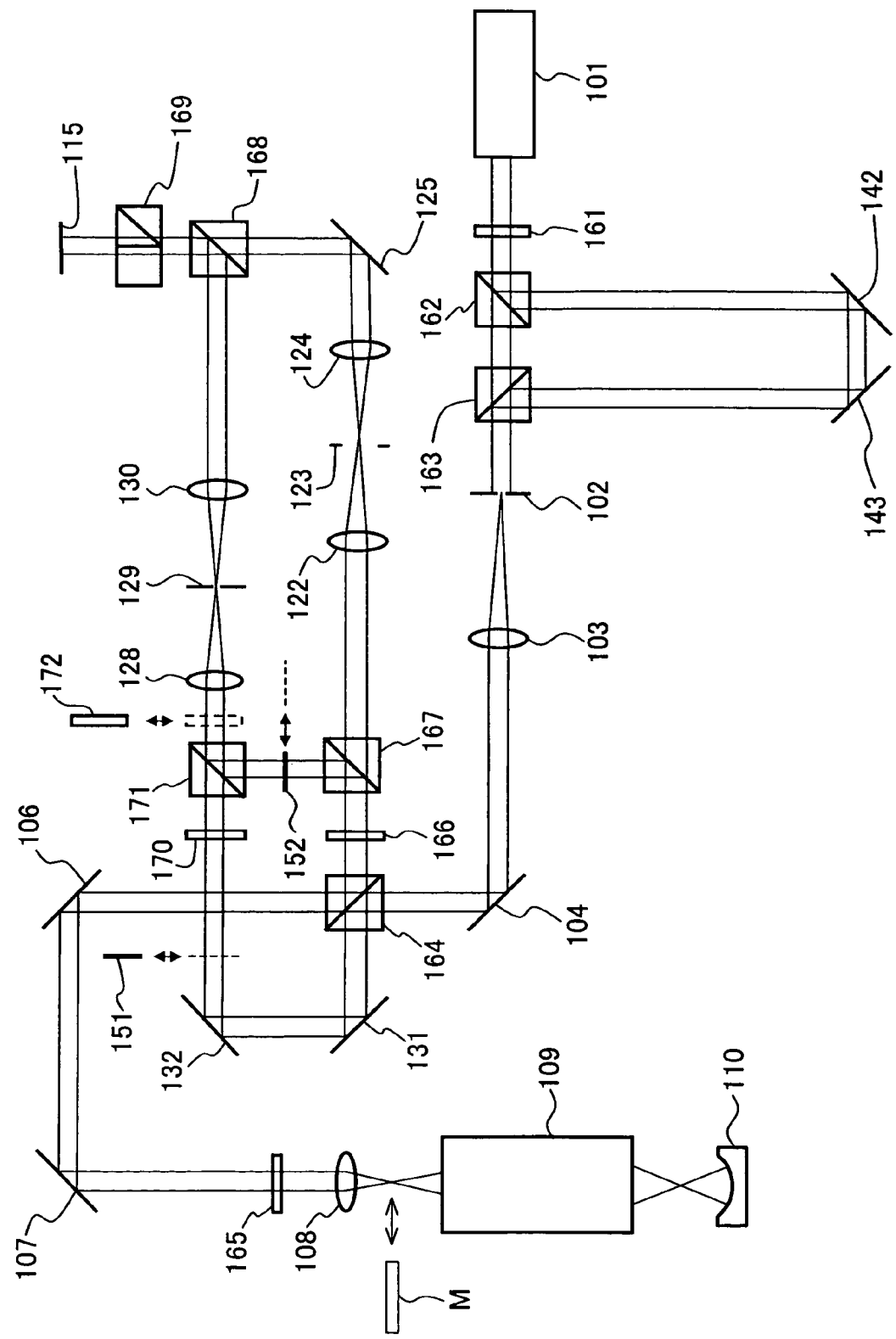
FIG. 6 schematically shows an arrangement of a point diffraction interference measuring apparatus according to a sixth embodiment of the present invention.

FIG. 6 schematically shows an arrangement of a point diffraction interference measuring apparatus according to a sixth embodiment of the present invention. The point diffraction interference measuring apparatus according to this embodiment comprises a polarizing beam splitter in place of the beam splitter used to perform the optical path division in the fourth embodiment described above. A detailed explanation will be made below about the arrangement in which the point diffraction interference measuring apparatus according to this embodiment is used in the alignment mode.

With reference to FIG. 6, the linearly polarized light flux of ultraviolet light, which is emitted from the light source 101, is subjected to the rotation of the orientation of polarization by the ½ wavelength plate 161, and it comes into the polarizing beam splitter 162. In this arrangement, the ½ wavelength plate 161 is constructed to be rotatable. When the ½ wavelength plate 161 is rotated, it is possible to regulate the orientation of the polarization of the light beam outgoing from the ½ wavelength plate 161. Accordingly, it is possible to regulate the light amount ratio between the P-polarized light beam (measuring light beam) and the S-polarized light beam (light beam coming into the reference light beam pinhole 129) divided by the polarizing beam splitter 164. The P-polarized light beam and the S-polarized light beam, which are included in the light flux coming into the polarizing beam splitter 162, are transmitted through and reflected by the polarizing beam splitter 162 respectively to make division into the two optical paths.

The divided two light fluxes are overlaid again by the polarizing beam splitter 163 to illuminate the light source pinhole 102. The light beam, which has passed through the light source pinhole 102, passes across the light-collecting lens 103 and the bending mirror 104, and the light beam comes into the polarizing beam splitter 164. The light beam, which has come into the polarizing beam splitter 164, is subjected to the transmission or the reflection for each of the polarized components by the polarizing beam splitter 164.

The light flux of the P-polarized light beam, which has transmitted through the polarizing beam splitter 164, passes across the bending mirror 106 and the bending mirror 107, and then it comes into the ¼ wavelength plate 165. In this arrangement, the light flux is converted into the circularly polarized light beam by the ¼ wavelength plate 165. The circularly polarized light beam, which has outgone from the ¼ wavelength plate 165, passes across the light-collecting lens 108 and the test sample 109, and the light beam is reflected by the returning reflecting mirror 110. The reflected light beam passes again across the test sample 109 and the light-collecting lens 108, and then the light beam comes into the ¼ wavelength plate 165. In this arrangement, the light flux is converted into the linearly polarized light beam in which the orientation of polarization is rotated by 90 degrees. The linearly polarized light beam, which has outgone from the ¼ wavelength plate 165, passes across the bending mirror 107 and the bending mirror 106, and it comes into the polarizing beam splitter 164. The linearly polarized light beam is reflected by the polarizing beam splitter 164, and the orientation of polarization is rotated by the ½ wavelength plate 166. The light flux is subjected to the transmission or the reflection for each of the polarized components by the polarizing beam splitter 167.

The light flux of the P-polarized light beam, which has been transmitted through the polarizing beam splitter 167, passes across the light-collecting lens 122, the aperture diaphragm 123, the collimator lens 124, and the bending mirror 125, and it comes into the polarizing beam splitter 168.

On the other hand, the light flux of the S-polarized light beam, which has been reflected by the polarizing beam splitter 164, passes across a bending mirror 131 and a bending mirror 132, and it comes into a ½ wavelength plate 170. In this arrangement, the light flux is subjected to the rotation of the orientation of polarization by the ½ wavelength plate 170 in order to avoid any reflection by a polarizing beam splitter 171. The light flux is transmitted through the polarizing beam splitter 171, and it comes into a ½ wavelength plate 172. In this arrangement, the light flux is subjected to the rotation of the orientation of polarization by the ½ wavelength plate 172 in order to avoid any reflection by the polarizing beam splitter 168. The light flux, which has outgone from the ½ wavelength plate 172, comes into the reference light beam pinhole 129 via the light-collecting lens 128. The light beam, which has passed through the reference light beam pinhole 129, passes across the collimator lens 130, and it comes into the polarizing beam splitter 168.

The two light fluxes, which have come into the polarizing beam splitter 168, are overlaid by the polarizing beam splitter 168. The overlaid light beam does not generate any interference fringe as it is because of the orthogonal orientation of the polarization. Therefore, the overlaid light beam passes across the polarizing beam splitter 169 which is rotated by 45 degrees about the optical axis with respect to the polarizing beam splitter 168, and then the light beam comes into the interference fringe-detecting section 115. Interference fringes are formed on the interference fringe-detecting section 115, and the transmission wavefront aberration of the test sample is calculated on the basis of the phase difference of the interference fringes.

When the measurement is performed in the measurement mode by using the point diffraction interference measuring apparatus according to this embodiment, then the shutter 151 is inserted into the optical path, and the shutter 152 and the ½ wavelength plate 172 are retracted to the outside of the optical path. When the measurement is performed in the alignment mode, then the shutter 151 is retracted to the outside of the optical path as described above, and the shutter 152 and the ½ wavelength plate 172 are inserted into the optical path.

When the measurement is performed in the measurement mode by using the point diffraction interference measuring apparatus according to this embodiment, then the light flux, which has outgone from the light source 101, is prevented from passing across the optical path length difference-correcting section H (see FIG. 3) by rotating (adjusting) the ½ wavelength plate 161, and thus it is possible to mitigate the loss of the light amount.

As described above, the point diffraction interference measuring apparatus according to this embodiment performs the division of the light flux by using the polarizing beam splitter. Therefore, the polarized light beam is effectively utilized, and thus it is possible to divide the light flux at the intended light amount ratio without causing any light amount loss. It is possible to improve the light amount in the point diffraction interference measuring apparatus.

The point diffraction interference measuring apparatus according to this embodiment is constructed such that one pinhole 129 is used for both of the reference light beam pinhole in the measurement mode and the reference light beam pinhole in the alignment mode. However, there is no limitation thereto. It is also possible to construct such an apparatus that different reference light beam pinholes are provided for the measurement mode and the alignment mode respectively.

Seventh Embodiment

Figure 7:
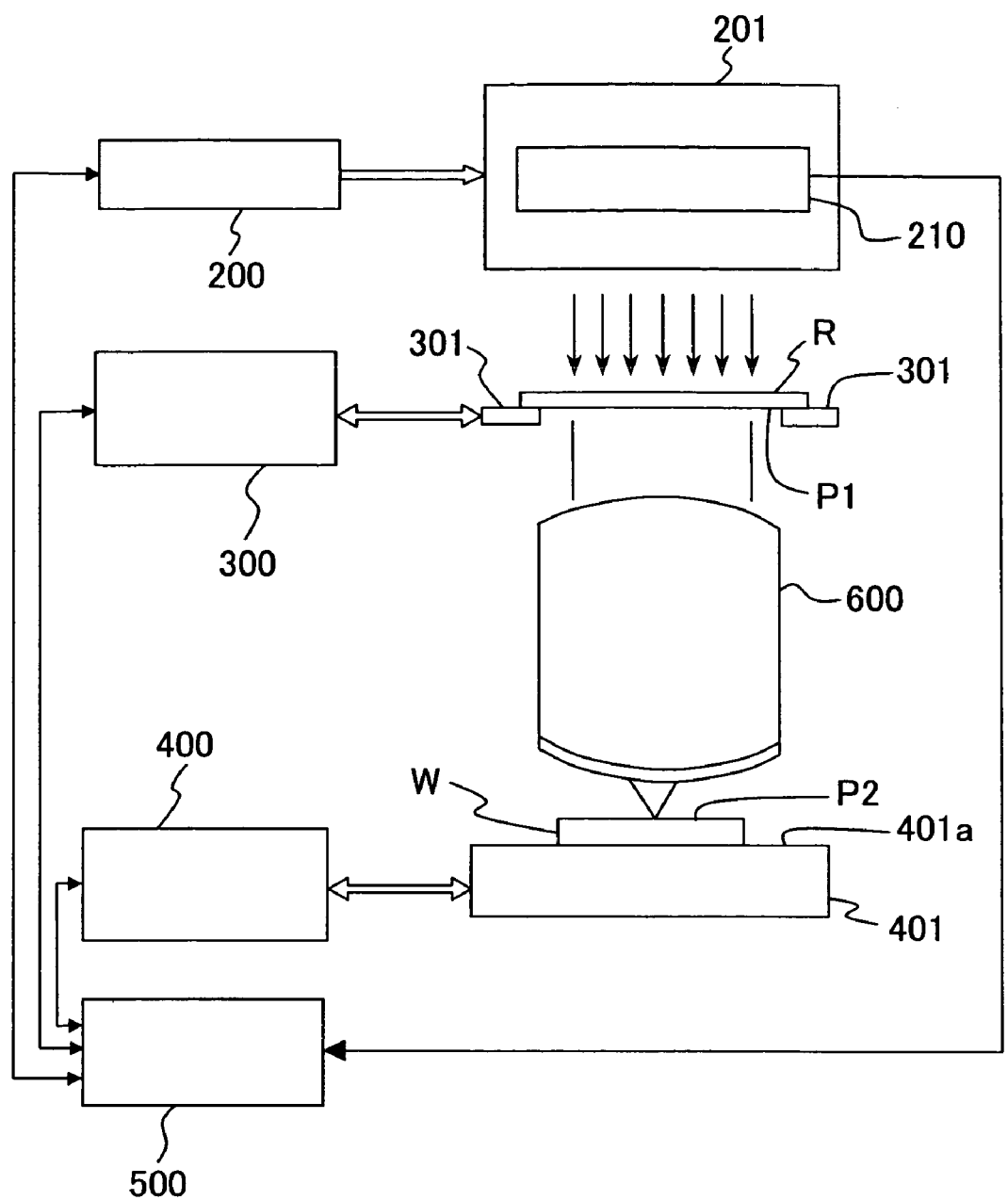
FIG. 7 schematically shows an arrangement of a projection exposure apparatus according to a seventh embodiment of the present invention.
Figure 8:
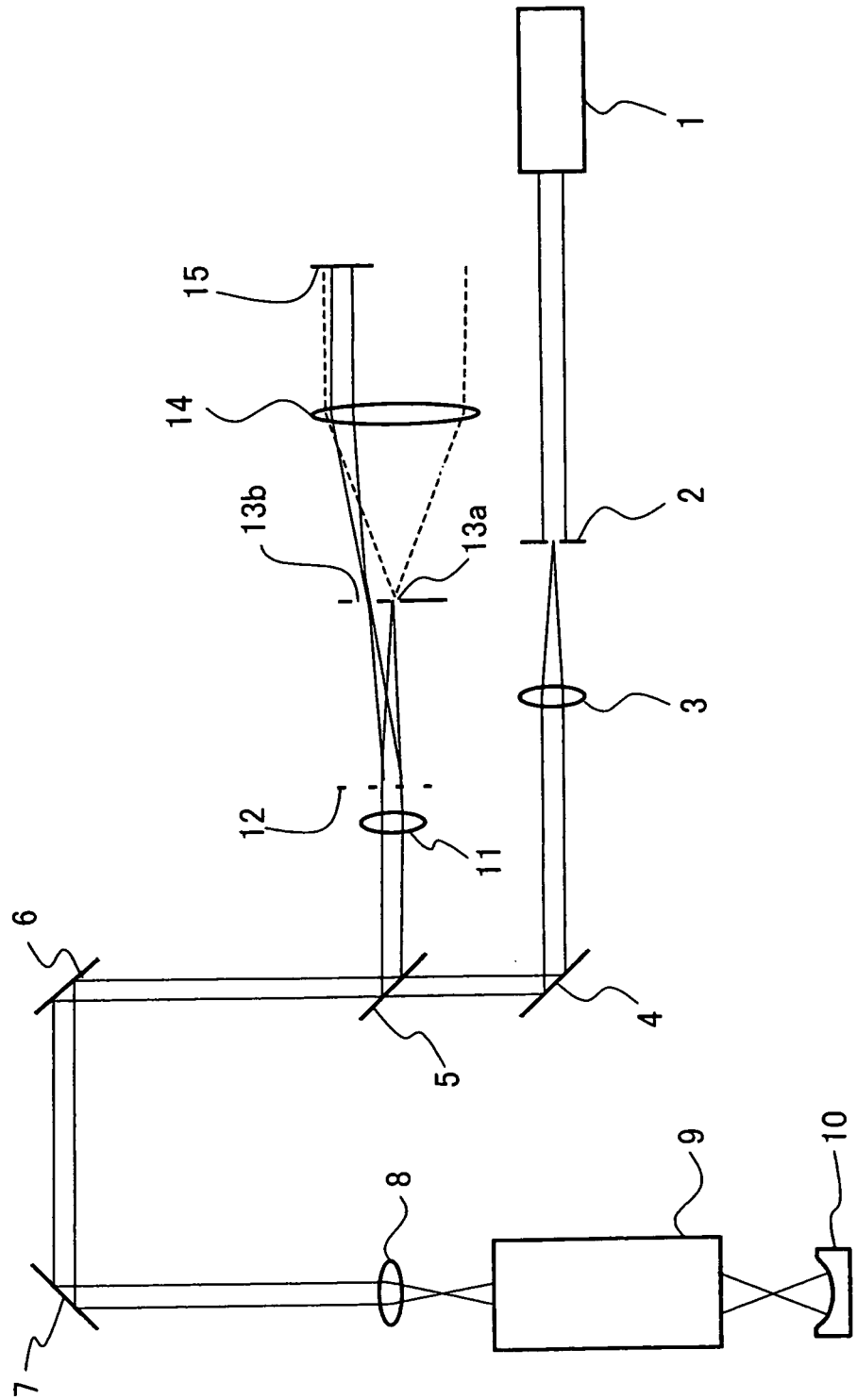
FIG. 8 schematically shows an arrangement of a conventional point diffraction interference measuring apparatus.

FIG. 7 schematically shows an arrangement of a projection exposure apparatus according to a seventh embodiment of the present invention. The projection exposure apparatus according to this embodiment carries, as a projection optical system, a highly accurate projection lens produced by using the point diffraction interference measuring apparatus according to any one of the embodiments described above.

The projection exposure apparatus according to this embodiment includes at least a wafer stage 401, a light source section 200 for supplying a light beam, and a projection optical system 600. In this arrangement, the wafer stage 401 has a surface 401a on which a substrate (wafer) W applied with a photosensitizer can be placed. A stage control system 400 controls the position of the wafer stage 401.

The projection optical system 600 involves the highly accurate projection lens produced by using the point diffraction interference measuring apparatus according to any one of the embodiments described above. The projection optical system 600 is arranged between an object plane P1 at which a reticle (mask) R is arranged and an image plane P2 which is coincident with the surface of the wafer W. The projection optical system 600 further includes an alignment optical system which is applied to the projection exposure apparatus of the scanning type.

An illumination optical system 201 includes an alignment optical system 210 for regulating the relative positions of the reticle R and the wafer W. The reticle R is provided to project, onto the wafer W, an image of a pattern formed on the reticle R. The reticle R is arranged on a reticle stage 301 which is capable of parallel displacement with respect to the surface 401a of the wafer stage 401. A reticle exchange system 300 exchanges and transports the reticle R set on the reticle stage 301. The reticle exchange system 300 includes a stage driver (not shown) for effecting parallel displacement of the reticle stage 301 with respect to the surface 401a of the wafer stage 401. A main control unit 500 makes control in relation to a series of processes ranging from the positional adjustment to the exposure.

Eighth Embodiment

When the point diffraction interference measuring apparatus according to any one of the embodiments described above is used, the wavefront aberration of the projection lens can be subjected to the interference measurement accurately and conveniently. The measurement accuracy is important to guarantee the final performance in relation to the highly accurate projection lens which is required to have the wavefront aberration approximate to the accuracy limit of the measuring apparatus. Further, the structural parameters (plane, center thickness, spacing, mutual deviation) of the projection lens can be readjusted and reprocessed highly accurately on the basis of the measured results. It is possible to produce the projection lens which is more highly accurate than the projection lens produced by using the conventional interference measuring apparatus. A method for producing the projection lens based on the use of the point diffraction interference measuring method and the point diffraction interference measuring apparatus according to the present invention will be described by way of example. The production method follows the following steps (1) to (6).

(1) At first, the initial assembling of the projection lens is performed.

(2) The wavefront aberration is measured at a plurality of points in the image plane by using the point diffraction interferometer as explained in any one of the embodiments.

(3) The measured wavefront aberration values are incorporated as data with an optical software which is capable of considering the design data of the projection lens and which is capable of performing the beam tracing to determine, by the calculation, the appropriate changes of the values with respect to the current situation for the structural parameters (plane, center thickness, spacing, mutual deviation) of the projection lens.

(4) The reprocessing is performed so that the plane and the center thickness of the optical part as the structural parameters of the projection lens are changed by the amounts of change determined by the calculation as described above.

(5) The reprocessed parts are reassembled, and the mutual deviation and the spacing between the optical parts as the other structural parameters are changed from the values obtained upon the initial assembling by the amounts of change determined by the calculation as described above.

(6) The wavefront aberration is measured at the plurality of points in the image plane by using the point diffraction interferometer to confirm whether or not the predetermined wavefront aberration performance is obtained. If the predetermined wavefront aberration performance is not obtained, the steps of (3) to (5) described above are performed again.

According to the construction as described above, it is possible to realize the projection exposure apparatus which carries the highly accurate projection lens. The point diffraction interference measuring method and the point diffraction interference measuring apparatus according to the present invention are not limited to the projection optical system to be used for the exposure apparatus, but can be also used to measure the characteristics of the lenses to be used for the illumination optical system and the optical system to be employed for the alignment for the illumination light beam in the exposure apparatus. Further, the point diffraction interference measuring method and the point diffraction interference measuring apparatus as well as the method for producing the projection lens according to the present invention can be used for the production processes and the measurement of the characteristics of arbitrary optical lenses such as those for microscopes, various inspection apparatuses based on the use of optical lenses, cameras, and glasses or spectacles.

INDUSTRIAL APPLICABILITY

According to the present invention, it is possible to provide the point diffraction interference measuring method and the point diffraction interference measuring apparatus which involve the reduced noise light beam that would be otherwise caused when the light flux is separated into the reference light beam and the measuring light beam to be used for the measuring method for measuring the optical characteristics of the test sample. Further, it is possible to provide the highly accurate projection lens which is produced by using the point diffraction interference measuring method, and the projection exposure apparatus which carries the highly accurate projection lens.

According to the present invention, it is possible to provide the point diffraction interference measuring method and the point diffraction interference measuring apparatus which make it possible to accurately perform, in a short period of time, the alignment for the reference light beam having passed through the test sample. When the method for producing the projection lens according to the present invention is used, the projection lens is provided, in which the wavefront aberration is satisfactorily adjusted. Therefore, according to the method for producing the projection lens of the present invention, it is possible to provide the highly accurate projection lens to be used for the exposure apparatus and the exposure apparatus which carries the highly accurate projection lens.

What is claimed is:

1. A point diffraction interference measuring method comprising:
    a step of forming a substantially ideal spherical wave;
    a step of dividing a light flux composed of the spherical wave into two light fluxes before passing the light flux through a test sample;
    a step of passing one light flux of the two light fluxes through a pinhole to convert the one light flux into a reference light beam which is a substantially ideal spherical wave;
    a step of passing only the other light flux of the two light fluxes through the test sample to obtain a measuring light beam; and
    a step of detecting interference fringes generated by causing interference between the reference light beam and the measuring light beam.

2. The point diffraction interference measuring method according to claim 1, further comprising the steps of:
    using a light source and a light source pinhole in order to form the substantially ideal spherical wave; and
    correcting a difference between an optical path length of the reference light beam from the light source to a section for detecting the interference fringes and an optical path length of the measuring light beam from the light source to the section for detecting the interference fringes to be within a coherent distance of a light beam coming from the light source.

3. The point diffraction interference measuring method according to claim 1, further comprising a light amount-adjusting step of adjusting at least one of a light amount of the reference light beam and a light amount of the measuring light beam so that the light amount of the reference light beam is substantially equal to the light amount of the measuring light beam on a surface for detecting the interference fringes.

4. The point diffraction interference measuring method according to claim 3, wherein the light amount-adjusting step is performed by inserting a ½ wavelength plate into an optical path of the light flux before dividing the light flux, and rotating the ½ wavelength plate on the basis of at least one of the light amounts of the measuring light beam and the reference light beam passed through the pinhole.

5. The point diffraction interference measuring method according to claim 4, wherein the light amount-adjusting step includes a measuring step of at least one of a reference light amount-measuring step of measuring the light amount of the reference light beam passed through the pinhole at a position downstream from the pinhole and a measuring light amount-measuring step of measuring the light amount of the measuring light beam after dividing the light flux, and a wavelength plate-adjusting step of rotating the ½ wavelength plate on the basis of a result of at least one of the reference light amount-measuring step and the measuring light amount-measuring step.

6. A method for producing a projection lens, comprising:
   measuring wavefront aberration of the projection lens in accordance with the method as defined in claim 1 by using the projection lens as the test sample; and
   reprocessing the projection lens on the basis of a measurement result of the measured wavefront aberration.

7. The method for producing the projection lens according to claim 6, wherein the projection lens is a projection lens used for an exposure apparatus.

8. A point diffraction interference measuring method comprising:
   a step of forming a light source spherical wave which is a substantially ideal spherical wave with a point light source-generating means;
   a step of switching first measurement and second measurement, the first measurement including passing a light source light flux composed of the light source spherical wave through a test sample, thereafter dividing the light flux passed through the test sample into two light fluxes by using a first optical path-dividing element, passing one light flux of the light fluxes divided by the first optical path-dividing element through a first pinhole to convert the one light flux into a first reference light beam which is a substantially ideal spherical wave, and detecting first interference fringes generated by causing interference between the first reference light beam and a first measuring light beam which is the other light flux of the light fluxes divided by the first optical path-dividing element, and the second measurement including dividing the light source light flux into two light fluxes by using a second optical path-dividing element before passing the light source light flux through the test sample, passing one light flux of the light fluxes divided by the second optical path-dividing element through a second pinhole to convert the one light flux into a second reference light beam which is a substantially ideal spherical wave, passing only the other light flux of the light fluxes divided by the second optical path-dividing element through the test sample to obtain a second measuring light beam, and detecting second interference fringes generated by causing interference between the second reference light beam and the second measuring light beam; and
   a step of using information on the second interference fringes for alignment to be performed when the light flux, which is provided to obtain the first reference light beam of the light fluxes divided by the first optical path-dividing element, is allowed to come into the first pinhole for the first measurement.

9. The point diffraction interference measuring method according to claim 8, wherein a common pinhole is used for both of the first pinhole and the second pinhole.

10. The point diffraction interference measuring method according to claim 8, wherein each of the first optical path-dividing element and the second optical path-dividing element has a polarizing beam splitter.

11. The point diffraction interference measuring method according to claim 8, further comprising a light amount-adjusting step of adjusting at least one of a light amount of the first reference light beam and a light amount of the first measuring light beam so that the light amount of the first reference light beam is substantially equal to the light amount of the first measuring light beam on a surface for detecting the interference fringes, and adjusting at least one of a light amount of the second reference light beam and a light amount of the second measuring light beam so that the light amount of the second reference light beam is substantially equal to the light amount of the second measuring light beam.

12. The point diffraction interference measuring method according to claim 11, wherein the light amount-adjusting step is such a step that a first ½ wavelength plate, which is arranged nearer to the point light source-generating means than the first optical path-dividing element, is rotated on the basis of at least one of the light amounts of the first measuring light beam and the first reference light beam passed through the first pinhole, and a second ½ wavelength plate, which is arranged nearer to the point light source-generating means than the second optical path-dividing element, is rotated on the basis of at least one of the light amounts of the second measuring light beam and the second reference light beam passed through the second pinhole.

13. The point diffraction interference measuring method according to claim 12, wherein the light amount-adjusting step includes a measuring step of at least one of a first reference light amount-measuring step of measuring the light amount of the first reference light beam passed through the first pinhole at a position nearer to a section for detecting the interference fringes than the first pinhole and a first measuring light amount-measuring step of measuring the light amount of the first measuring light beam at a position nearer to the section for detecting the interference fringes than the first optical path-dividing element, and a first wavelength plate-adjusting step of rotating the first ½ wavelength plate on the basis of a result of at least one of the first reference light amount-measuring step and the first measuring light amount-measuring step; and
   a measuring step of at least one of a second reference light amount-measuring step of measuring the light amount of the second reference light beam passed through the second pinhole at a position nearer to the section for detecting the interference fringes than the second pinhole and a second measuring light amount-measuring step of measuring the light amount of the second measuring light beam at a position nearer to the section for detecting the interference fringes than the second optical path-dividing element, and a second wavelength plate-adjusting step of rotating the second ½ wavelength plate on the basis of a result of at least one of the second reference light amount-measuring step and the second measuring light amount-measuring step.

14. A point diffraction interference measuring method comprising:
   a step of forming a substantially ideal spherical wave;
   a step of dividing, into two light fluxes, a light flux obtained by passing the spherical wave through a test sample;
   a step of passing one light flux of the two light fluxes through a pinhole to convert the one light flux into a reference light beam which is a substantially ideal spherical wave;
   a step of detecting interference fringes generated by causing interference between the reference light beam and a measuring light beam which is the other light flux of the two light fluxes; and a step of adjusting at least one of a light amount of the reference light beam and a light amount of the measuring light beam so that the light amount of the reference light beam is substantially equal to the light amount of the measuring light beam on a surface for detecting the interference fringes.

15. The point diffraction interference measuring method according to claim 14, wherein the light amount-adjusting step is performed by inserting a ½ wavelength plate into an optical path of the light flux before dividing the light flux, and rotating the ½ wavelength plate on the basis of at least one of the light amounts of the measuring light beam and the reference light beam passed through the pinhole.

16. The point diffraction interference measuring method according to claim 15, wherein the light amount-adjusting step includes a measuring step of at least one of a reference light amount-measuring step of measuring the light amount of the reference light beam passed through the pinhole at a position downstream from the pinhole and a measuring light amount-measuring step of measuring the light amount of the measuring light beam after dividing the light flux, and a wavelength plate-adjusting step of rotating the ½ wavelength plate on the basis of a result of at least one of the reference light amount-measuring step and the measuring light amount-measuring step.

17. A method for producing a projection lens, comprising:
measuring wavefront aberration of the projection lens in accordance with the method as defined in claim 14 by using the projection lens as the test sample; and
reprocessing the projection lens on the basis of a measurement result of the measured wavefront aberration.

18. The method for producing the projection lens according to claim 17, wherein the projection lens is a projection lens used for an exposure apparatus.

19. A point diffraction interference measuring apparatus comprising:
a point light source-generating unit which generates a spherical wave;
an optical path-dividing element which divides a light beam emitted from the point light source-generating unit into a reference light beam and a measuring light beam directed toward a test sample;
a pinhole which converts the reference light beam into a substantially ideal spherical wave; and
an interference fringe-detecting section which detects interference fringes generated by causing interference between the measuring light beam coming from the test sample and the reference light beam coming from the pinhole.

20. The point diffraction interference measuring apparatus according to claim 19, further comprising an optical path length difference-correcting section which adjusts an optical path length of the reference light beam with respect to an optical path length of the measuring light beam.

21. The point diffraction interference measuring apparatus according to claim 19, further comprising a light amount-adjusting section which adjusts at least one of a light amount of the reference light beam and a light amount of the measuring light beam so that the light amount of the reference light beam passed through the pinhole is substantially equal to the light amount of the measuring light beam on a detecting surface of the interference fringe-detecting section.

22. The point diffraction interference measuring apparatus according to claim 21, wherein the light amount-adjusting section includes a ½ wavelength plate which is arranged nearer to the point light source-generating unit than the optical path-dividing element, and a rotating mechanism which rotates the ½ wavelength plate on the basis of at least one of the light amounts of the measuring light beam and the reference light beam passed through the pinhole.

23. The point diffraction interference measuring apparatus according to claim 22, further comprising a reference light amount-measuring section which is arranged nearer to the interference fringe-detecting section than the pinhole and which measures the light amount of the reference light beam, and a measuring light amount-measuring section which is arranged nearer to the interference fringe-detecting section than the optical path-dividing element and which measures the light amount of the measuring light beam.

24. A point diffraction interference measuring apparatus comprising:
a point light source-generating unit which generates a spherical wave;
an optical path-dividing element which divides a light beam, which has been emitted from the point light source-generating unit and has passed through a test sample, into a measuring light beam and a reference light beam by reflection or refraction;
a pinhole which converts the reference light beam into a substantially ideal spherical wave;
an interference fringe-detecting section which detects interference fringes generated by causing interference between the measuring light beam and the reference light beam coming from the pinhole; and
a light amount-adjusting section which adjusts at least one of a light amount of the reference light beam and a light amount of the measuring light beam so that the light amount of the reference light beam passed through the pinhole is substantially equal to the light amount of the measuring light beam on a detecting surface of the interference fringe-detecting section.

25. The point diffraction interference measuring apparatus according to claim 24, wherein the light amount-adjusting section includes a ½ wavelength plate which is arranged nearer to the point light source-generating unit than the optical path-dividing element, and a rotating mechanism which rotates the ½ wavelength plate on the basis of at least one of the light amounts of the measuring light beam and the reference light beam passed through the pinhole.

26. The point diffraction interference measuring apparatus according to claim 25, further comprising a reference light amount-measuring section which is arranged nearer to the interference fringe-detecting section than the pinhole and which measures the light amount of the reference light beam, and a measuring light amount-measuring section which is arranged nearer to the interference fringe-detecting section than the optical path-dividing element and which measures the light amount of the measuring light beam.

27. A point diffraction interference measuring apparatus comprising:
a point light source which generates a spherical wave;
an optical path-dividing element which divides a light beam emitted from the point light source into a reference light beam and a measuring light beam which passes through a test sample;
a pinhole which converts the reference light beam into a substantially ideal spherical wave;
an optical path-switching unit which switches an optical path for the reference light beam into a first reference optical path for making introduction into the pinhole via the test sample and a second reference optical path for making introduction into the pinhole without passing through the test sample; and an interference fringe-detecting unit which detects interference fringes generated by causing interference between the measuring light beam and the reference light beam coming from the pinhole.

28. The point diffraction interference measuring apparatus according to claim 27, further comprising an optical path length difference-correcting section which adjusts an optical path length of the reference light beam with respect to an optical path length of the measuring light beam.

29. The point diffraction interference measuring apparatus according to claim 27, wherein the optical path-switching unit is a shutter which opens/closes the optical paths of the first reference optical path and the second reference optical path.

30. An interference measuring method for measuring an optical characteristic of a test sample placed on a measuring optical path by using an interference measuring apparatus including a point light source which generates a substantially ideal spherical wave, a dividing element which divides the spherical wave into a reference light beam and a measuring light beam which passes through the test sample, a pinhole which converts the reference light beam into an ideal spherical wave, and a detector which detects interference between the measuring light beam and the reference light beam passed through the pinhole, the interference measuring method comprising:

a first step of passing the reference light beam and the measuring light beam through the measuring optical path in a state in which the test sample is absent in the measuring optical path and adjusting the reference light beam and the measuring light beam to obtain optimum interference fringes;

a second step of placing the test sample in the measuring optical path and changing an optical path for the reference light beam so that the reference light beam passes through the pinhole without passing through the measuring optical path;

a third step of performing alignment for the test sample relative to the measuring optical path so that a state, which is most approximate to the interference fringes obtained in the first step, is obtained after changing the optical path for the reference light beam in the second step; and a fourth step of changing the optical path so that the reference light beam passes through the measuring optical path in a state in which the alignment has been performed in the third step to observe the interference fringes in this state.

31. A method for producing a projection lens, comprising:

measuring wavefront aberration of the projection lens in accordance with the method as defined in claim 30 by using the projection lens as the test sample; and reprocessing the projection lens on the basis of a measurement result of the measured wavefront aberration.

32. The method for producing the projection lens according to claim 31, wherein the projection lens is a projection lens used for an exposure apparatus.

* * * * *